Feb. 6, 1951     A. N. STANTON     2,540,796
VIBRATION TRANSLATOR

Filed Nov. 28, 1949     2 Sheets-Sheet 1

INVENTOR.

Austin N. Stanton

INVENTOR.
Austin N. Stanton

Patented Feb. 6, 1951

2,540,796

UNITED STATES PATENT OFFICE 2,540,796

VIBRATION TRANSLATOR

Austin N. Stanton, Garland, Tex.

Application November 28, 1949, Serial No. 129,782

10 Claims. (Cl. 171—209)

This invention relates to energy translating devices and more particularly to energy translating devices which convert mechanical vibrations into electrical energy.

This application is directed to the invention disclosed in my abandoned application Serial Number 565,161, filed November 25, 1944.

In many applications, such as seismic exploration of the earth's surface and analysis of structure vibration, it is desirable to translate mechanical vibrations into electrical energy having a characteristic which reflects the amplitude, shape and time relationship of the mechanical vibrations. Extreme sensitivity and accuracy of translation are necessary and the translating device must therefore be unresponsive to extraneous magnetic disturbances.

Accordingly, it is an object of my invention to provide a new and improved means for translating mechanical energy into electrical energy.

It is another object of my invention to provide a new and improved means for translating mechanical vibrations into electrical energy having a characteristic which reflects the amplitude, shape and time relationship of the mechanical vibrations.

It is another object of my invention to provide a new and improved means for translating mechanical vibrations into electrical energy which is unresponsive to extraneous magnetic disturbances.

It is still another object of my invention to provide a new and improved means for translating mechanical vibrations into electrical energy, the voltage of which is generated as a result of changes in the amount of magnetic flux flowing in alternative magnetic circuits, the sum of the fluxes flowing in the alternative circuits remaining substantially constant.

Briefly stated, in the illustrated embodiment of my invention I provide a new and improved vibration translator which comprises a tubular magnet and an armature mounted for movement along the central axis of the tubular magnet. The armature comprises a helically wound coil concentric with respect to the central axis of the magnet mounted between a central field piece and a tubular field piece. The two field pieces constitute alternative magnetic flux paths and the amount of flux passing through each field piece changes in accordance with the movement of the armature along the central axis of, and relative to, the tubular magnet although the sum of the magnetic fluxes flowing through the field pieces remains substantially constant regardless of the movement of the armature. The change in the amount of flux passing through each field piece changes the magnetic field about the coil and induces a potential in the coil. Any suitable means may be employed to transmit the mechanical vibrations to the armature to produce corresponding movement of the armature with respect to the tubular magnet. The electric current induced by this relative movement will have a potential which will reflect the amplitude, shape and time relationship of the mechanical vibrations. The electric currents generated in the coil may be used or recorded by any conventional means, such as a reflecting galvanometer controlling light projected onto a moving photographic film.

For a better understanding of my invention, reference may be had to the following description taken in connection with the accompanying drawing, and its scope will be pointed out in the appended claims.

Figure 2:
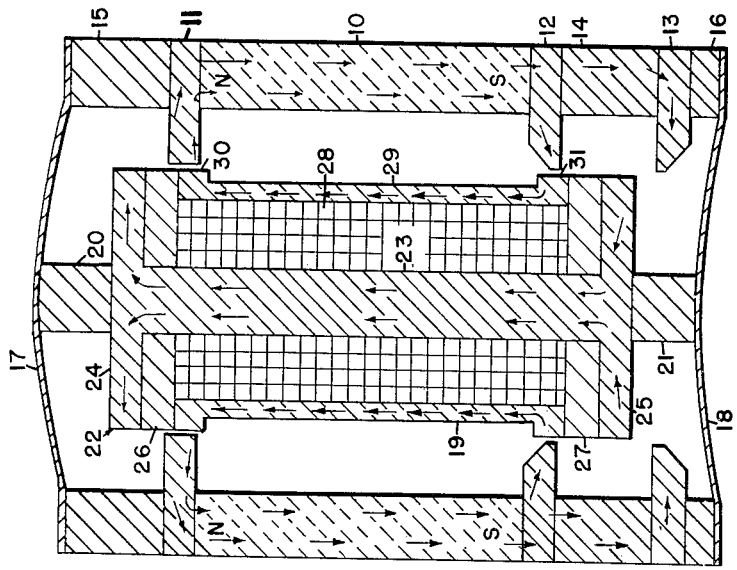
Figure 2 is a central longitudinal section of the device shown in Figure 1 with the armature displaced in one direction from its normal, medial position.
Figure 1:
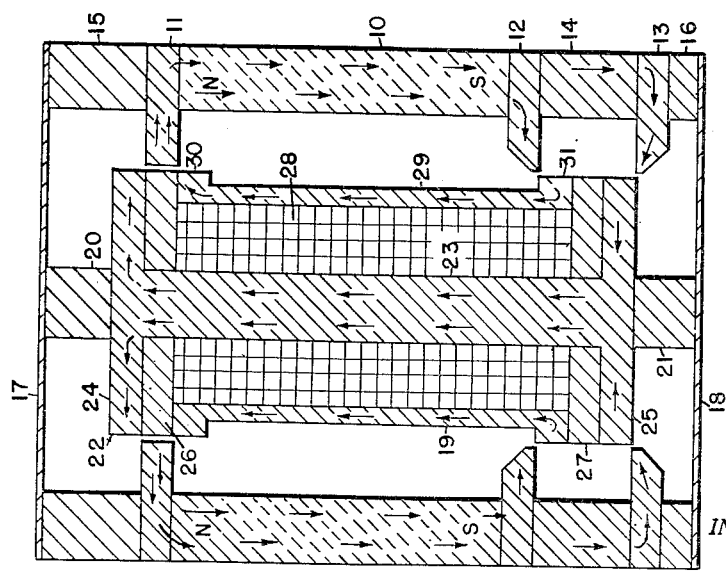
Figure 1 is a central longitudinal section showing a preferred embodiment of my invention with the armature in its normal medial position.
Figure 3:
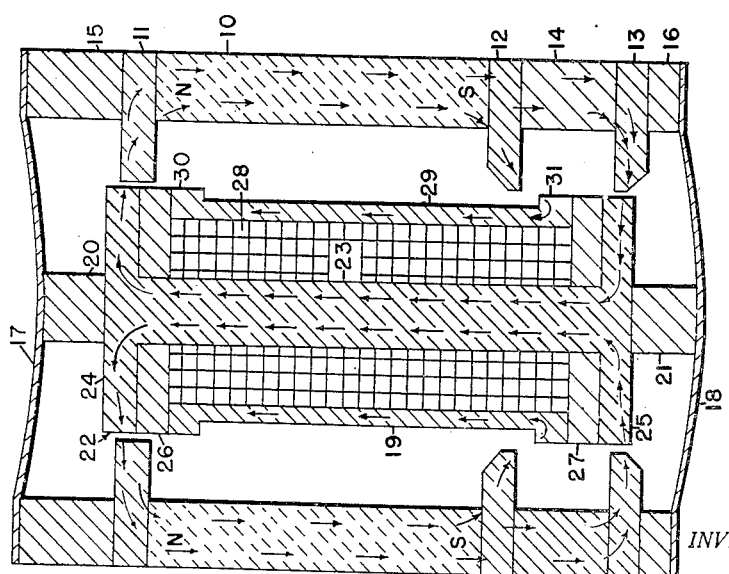
Figure 3 is a central longitudinal section of the device with the armature displaced in the opposite direction from its normal, medial position from the displacement direction shown in Figure 2.

Referring to Figures 1 to 3 of the drawing, a tubular permanent magnet 10, magnetized parallel to its central axis, is provided at one end with an annular pole piece 11 which is concentric with respect to the central axis of the magnet 10 and which extends inwardly from the magnet 10. The other end of magnet 10 is provided with annular pole pieces 12 and 13 which are separated by a cylindrical spacing block 14. Pole pieces 12 and 13 are also concentric with respect to the central axis and extend inwardly. Magnet 10 is preferably made of alloy steel having a high magnetic strength while pole pieces 11, 12, 13 and block 14 are preferably made of soft steel having a low reluctance.

Mounted on pole pieces 11 and 13 are annular spacing members 15 and 16, respectively. Members 15 and 16 are of nonmagnetic material, such as brass, and are concentric with respect to the central axis of magnet 10. Members 15 and 16 act as anchoring means for resilient means 17 and 18, respectively, which are preferably diaphragm springs and which support an armature 19 by means of members 20 and 21. Armature 19 comprises a central field piece 22 having a central core 23 provided at its ends with disks 24 and 25. Central field piece 22 is concentric with respect to the central axis of the magnet 10 and, because of its resilient mounting, is movable along the central axis. A pair of washers 26 and 27 of nonmagnetic material are mounted upon core 23 and about disks 24 and 25. A helically wound coil 28 is disposed about core 23 between washers 26 and 27. The central axis of coil 28 coincides with the central axis of magnet 10. The two ends (not shown) of the coil 28 may be brought to stationary terminals (not shown) through flexible leads. The ends may also be connected to the resilient means 17 and 18 which would have to be insulated from the other elements of the device. Both methods of bringing out the two ends of the coil are conventional in the art. Currents generated in coil 28 and brought out in any conventional manner may be used or recorded by any well known means, such as a reflecting galvanometer controlling light projected on a moving strip of film.

A tubular field piece 29 having at its ends outwardly extending flanges 30 and 31 is mounted on central field piece 22 between washers 26 and 27. The peripheral edges of flanges 30 and 31, washers 26 and 27, and disks 24 and 25 lie in the same cylindrical plane. Coil 28 lies between core 23 and tubular field piece 29. Field pieces 22 and 29 are of soft steel having a low reluctance.

In its normal, medial position, as is shown in Figure 1, armature 19 presents two paths of equal reluctance to the magnetic flux of magnet 10. The reluctance of the magnetic flux path comprising annular pole piece 12, spacing block 14, pole piece 13, disk 25, core 23, disk 24 and pole piece 11 is equal to the reluctance of the magnetic flux path comprising annular pole piece 12, tubular field piece 29 and annular pole piece 11. The two paths have the same reluctance only when armature 19 is in its medial position, and, when it is in this position, equal amounts of magnetic flux flow through each of the flux paths.

When armature 19 is displaced to the position shown in Figure 2, disks 24 and 25 are moved away from annular pole pieces 11 and 13 thereby including relatively large air gaps in the magnetic flux path which comprises core 23. The reluctance of this magnetic flux path, therefore, is increased. Tubular field piece 29 is moved at the same time into a position where its flanges 30 and 31 are in close relation with annular pole pieces 11 and 12. The reluctance of the magnetic flux path which comprises tubular field piece 29 is therefore decreased. Due to these changes in the reluctances of the two paths, the amount of magnetic flux flowing in the path which comprises tubular field piece 29 is increased while the amount of flux flowing in the path which comprises central field piece 19 is decreased. The changing of the amount of flux flowing through each path changes the magnetic field about coil 28 thereby inducing a potential in coil 28. As will be well understood by those skilled in the art, the potential induced in coil 26 will vary with the amount and speed of displacement of armature 19 with respect to magnet 10.

When armature 19 is displaced to the position shown in Figure 3, the reluctance of the flux path which includes tubular field piece 29 is increased since relatively large air gaps are included in the path between pole piece 11 and flange 30, and between pole piece 12 and flange 31. At the same time the reluctance of the flux path which includes central field piece 22 is decreased since disks 24 and 25 are brought into close relation with pole pieces 11 and 13, respectively. The resultant changes in the amount of flux flowing in the two flux paths produce a change in the magnetic field about coil 28 but the change is opposite to the change produced when armature 19 is moved to the position of Figure 2. In moving from its medial position to the position shown in Figure 2, armature 19 causes a large portion of the magnetic lines of force of magnet 10 to move farther away from the central axis of magnet 10. The magnetic lines of force cut the coil 28 in their movement and induce a potential in coil 28. When armature 19 moves to the position shown in Figure 3, it causes the magnetic lines of force of magnet 10 to move closer to the central axis of magnet 10. In their movement, the magnetic lines of force again cut the coil 28 but this time their direction of movement is directly opposite to that caused by the movement of armature 19 to the position of Figure 2. A potential of opposite polarity to that induced by the movement of armature 19 to the position of Figure 2 is therefore induced in coil 28. As will be well understood by those skilled in the art, the potentials induced in coil 28 will vary in accordance with the speed and amount of axial displacement of armature 19 with respect to magnet 10. Any suitable means may be employed to transmit the mechanical vibrations to armature 19 and produce corresponding axial movement of armature 19 along the central axis of magnet 10.

It is to be noted that coil 28, during normal displacements of armature 19, moves parallel to the magnetic line of force of magnet 10. Substantially no lines of force are cut by, and substantially no potential is induced in, coil 28 due to this movement of coil 28. It is only the shifting of the magnetic flux from one path to the other which causes movement of the magnetic lines of force in a direction which results in coil 28 cutting the magnetic lines of force and induces a potential in coil 28.

The potentials induced in coil 28 will correspond very closely in amplitude, shape and time relation to the mechanical vibrations transmitted to armature 19 since under normal operating conditions the losses due to reluctance will remain substantially constant whatever the position of armature 19 with respect to the magnet 10. The magnetic attraction of pole pieces 11, 12 and 13 for field pieces 22 and 29 will also remain substantially constant under normal operating conditions. Extraneous magnetic disturbances do not affect the potentials induced in coil 28 since the soft iron field pieces 22 and 29 enclose coil 28 and shield it from such magnetic disturbances. Magnet 10, pole pieces 11, 12 and 13, and spacing block 14 also act as shielding means against extraneous magnetic disturbances. Further shielding means may be provided in the form of soft iron caps (not shown) over each end of my vibration translator.

Figure 4:
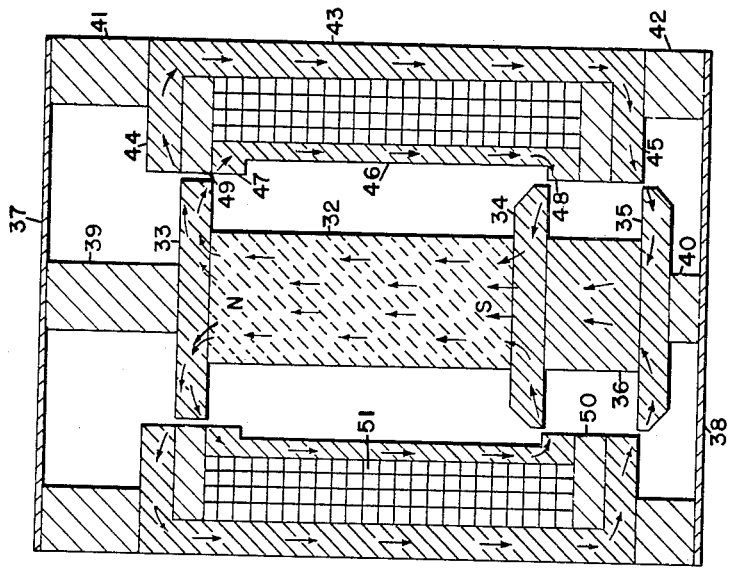
Figure 4 is a central longitudinal section of a modified form of my invention.

Figure 4 illustrates a modified form of the device disclosed in Figures 1 to 3 in which a movable rod-shaped magnet 32 is utilized instead of the tubular magnet 10.

The rod-shaped magnet 32 is provided at one end with a disk-shaped pole piece 33 and at the other end with disk-shaped pole pieces 34 and 35 which are separated by a circular spacing block 36.

Magnet 32 and its pole pieces 33, 34 and 35 are resiliently mounted by means of diaphragm springs 37 and 38 and blocks 39, 40, 41 and 42 upon a cylindrical field piece 43 which has at its ends inwardly extending annular members 44 and 45. A tubular field piece 46 provided at its ends with inwardly projecting flanges 47 and 48 is mounted on cylindrical field piece 43. Annular members 49 and 50, which are of a suitable nonmagnetic material, separate field piece 43 from field piece 46. A tubular coil 51 is disposed between the field pieces and is provided with suitable leads (not shown) which conduct the current generated in the coil to any suitable instrument. The mode of operation of the device illustrated in Figure 4 is substantially the same as that of the device illustrated in Figures 1 to 3. The device comprises two flux paths one of which comprises pole piece 34, field piece 46 and pole piece 33. The other flux path comprises pole piece 34, spacing block 36, pole piece 35, field piece 43, and pole piece 33. The combined reluctance of the two flux paths remains substantially constant during normal displacements of magnet 32. The individual reluctances of the two flux paths, however, vary in accordance with the displacement of magnet 32 in the same manner as the reluctances of the two flux paths of the device illustrated in Figures 1 to 3.

In order to minimize eddy currents generated in the various components of the magnetic flux paths by the movement of the magnetic lines of force, the various components of my vibration translator may be laminated in planes parallel to the magnetic lines of force in the manner well known to those skilled in the art. The eddy currents may be employed however to provide a magnetic damping means for the moving parts of the device.

While I have shown and described preferred embodiments of my invention, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In a device for translating mechanical energy into electrical energy: a tubular magnet having a central axis, said magnet being magnetized parallel to said central axis; a first annular pole piece concentric with respect to said central axis extending inwardly from one end of said magnet; a second and a third annular pole pieces separated by an annular spacing block concentric with respect to said central axis extending inwardly from the other end of said magnet; and an armature resiliently mounted for movement along said central axis and having a central axis coincident with said central axis of said magnet, said armature comprising a central field piece having a central core provided at each end with a disk, a tubular field piece concentric with respect to said central axis mounted on said central field piece between said disk and separated from said disks by nonmagnetic annular washers, said tubular field piece having at its ends outwardly extending annular flanges abutting said washers, the peripheral edges of said disks, washers and flanges lying in the same cylindrical plane, one of said washers lying in the same plane normal to said central axis as said first annular pole piece when said armature is in its normal position, the other of said washers and its abutting flange and disk lying in planes parallel to and between the planes of said second and third annular pole pieces when said armature is in its normal position, and a tubular coil between said core and said tubular field piece having a central axis coincident with said central axis of said tubular magnet.

2. In a device for translating mechanical energy into electrical energy: a tubular magnet having a central axis, said magnet being magnetized parallel to said central axis; a first annular pole piece concentric with respect to said central axis, extending inwardly from one end of said magnet; second and third annular pole pieces separated by an annular spacing block concentric with respect to said central axis extending inwardly from the other end of said magnet; and an armature resiliently mounted for movement along said central axis and having a central axis coincident with said central axis of said tubular magnet, said armature comprising a central field piece having a central core provided at each end with a disk, a tubular field piece mounted between said disks and separated from said disks, said second annular pole piece and said tubular pole piece comprising a portion of a first magnetic flux path, said third annular pole piece and said central field piece constituting a portion of a second magnetic flux path, the reluctance of one magnetic flux path decreasing as the reluctance of the other path increases upon movement of said armature along said central axis, and a tubular coil between said core and said tubular field piece having a central axis coincident with central axis of said tubular magnet.

3. In a device for translating mechanical energy into electrical energy: a tubular magnet having a central axis, said magnet being magnetized parallel to said central axis; a pair of pole pieces spaced from one another along said central axis at one end of said magnet; an armature resiliently mounted for movement along said central axis, said armature comprising a tubular coil having a central axis coincident with said central axis of said magnet; a first magnetic means providing a portion of a first path within said tubular coil for the flux of said magnet; and a second magnetic means about the outside cylindrical surface of said coil providing a portion of a second path for the flux of said magnet, said pair of pole pieces and said first and second field pieces cooperating to maintain the reluctance of said first and second flux paths substantially constant, the reluctance of one path decreasing and the reluctance of the other path increasing upon movement of said armature along said central axis of said magnet, one of said magnetic means approaching one of said pole pieces and the other of said magnetic means simultaneously withdrawing from the other of said pole pieces upon movement of said armature along said central axis of said magnet.

4. In a device for translating mechanical energy into electrical energy: a unit comprising a tubular coil having a central axis, a first means within said coil providing a portion of a first magnetic flux path, and a second means about said coil providing a portion of a second magnetic flux path; a magnet symmetrically arranged about said central axis and magnetized parallel to said central axis; and a pair of pole pieces spaced from one another along said central axis and fixed to one end of said magnet; a single pole piece on the other end of said magnet, said magnet and said unit being resiliently connected for relative movement along said central axis, one of said pole pieces providing a portion of said first magnetic flux path and the other of said pole pieces providing a portion of said second magnetic flux path, said first and second flux paths having a substantially constant combined reluctance, the reluctance of one path decreasing and the reluctance of the other path simultaneously increasing upon relative movement between said magnet and said unit along said central axis, one of said pair of pole pieces and one of said means approaching each other and the other of said pair of pole pieces and the other of said means simultaneously withdrawing from one another upon relative movement between said unit and said magnet along said central axis, said one of said means simultaneously approaching said single pole piece and said other of said means simultaneously drawing away from said single pole piece.

5. In a device for translating mechanical energy into electrical energy: a unit comprising a tubular coil having a central axis, a first means within said coil providing a portion of a first magnetic flux path, a second means about the outer surfaces of said coil providing a portion of a second magnetic flux path, and first and second annular means of non-magnetic material separating said first and second means; a magnet symmetrically arranged about said central axis and magnetized parallel to said central axis; a first pole piece on one end of said magnet lying in a plane normal to said central axis and coincident with the plane of said first annular means when said unit is in normal position with respect to said magnet; second and third pole pieces separated by a spacing block on the other end of said magnet and lying in planes normal to said central axis; second and third pole pieces separated by a spacing block on the other end of said magnet and lying in planes normal to said central axis, said second annular means lying in a plane normal to said central axis and medially between the planes of said second and third pole pieces when said magnet and unit are in normal position with respect to each other, said first and second magnetic paths having a substantially constant combined reluctance, the reluctance of one of said paths decreasing and the reluctance of the other of said paths simultaneously increasing upon relative movement between said magnet and said unit along said central axis; and resilient means connecting said unit and said magnet to allow relative movement between said magnet and said unit along said central axis.

6. In combination: a cylindrical field piece having at each end an inwardly extending annular member; a tubular field piece having at each end an inwardly extending flange mounted within said cylindrical field piece; annular means of non-magnetic material between each of said flanges and its adjacent annular member; a tubular coil between said field pieces; said field pieces and said coil being concentric with respect to a central axis; said flanges, annular means and annular members having inner surfaces lying in a common cylindrical plane concentric with respect to said central axis; a magnet resiliently mounted within said tubular field piece for movement along said central axis, said magnet being magnetized parallel to said central axis; a circular field piece on one end of said magnet lying adjacent to one of said annular means when said magnet is in its normal position with respect to said field pieces; second and third pole pieces separated by a spacing block on the other end of said magnet, the other of said annular means and its adjacent flange and inwardly extending annular member lying in planes parallel to and between the planes of said second and third pole pieces when said magnet is in its normal position, said magnet and said pole pieces being concentric with respect to said central axis.

7. In a device for translating mechanical energy into electrical energy: a magnet having a central axis, said magnet being magnetized parallel to said axis; a pair of pole pieces fixed to one end of said magnet, said pole pieces being spaced along said axis and lying in planes perpendicular to said axis; a single pole piece on the other end of said magnet; a coil concentric with respect to said axis; means resiliently connecting said magnet and said coil for reciprocal movement of said coil and said magnet relative to each other along said central axis and parallel to the lines of force of said magnet; a field piece within said coil; and a field piece around said coil, said field pieces cooperating with said pair of pole pieces to cause movement of said magnetic lines of force during said relative movement between said magnet and said coil to induce a potential within said coil, one of said field pieces and one of said pole pieces approaching one another and the other of said field pieces and the other of said pole pieces simultaneously drawing away from each other upon relative movement between said magnet and said coil along said central axis, said one of said field pieces simultaneously approaching said single pole piece and said other of said field pieces simultaneously drawing away from said single pole piece.

8. In a device for translating mechanical energy into electrical energy: a magnet having a central axis, said magnet being magnetized parallel to said axis; a pair of pole pieces spaced along said central axis and fixed to one end of said magnet; a single pole piece on the other end of said magnet; a coil concentric with respect to said axis; means resiliently connecting said magnet and said coil for reciprocal movement of said coil and said magnet relative to each other along said central axis and parallel to the lines of force of said magnet; a field piece within said coil; and a field piece around said coil, said field pieces being concentric with respect to said central axis and providing in cooperation with said pole pieces alternative flux paths for the magnetic flux of said magnet whereby relative movement between said magnet and said coil along said axis causes shifting of the magnetic flux of said magnet from one path to the other and results in the movement of said magnetic lines of force relative to said coil inducing a potential in said coil, one of said pole pieces approaching one another and the other of said field pieces and the other of said pole pieces simultaneously drawing away from one another upon relative movement of said magnet and said coil along said central axis, said one of said field pieces simultaneously approaching said single pole piece and said other of said field pieces simultaneously drawing away from said single pole piece.

9. In combination: a unit comprising a coil having a central axis, a field piece within said coil providing a portion of a first magnetic flux path, and a tubular field piece about said coil having a central axis coincident with said first mentioned central axis providing a portion of a second magnetic flux path; a tubular magnet symmetrically arranged about said central axis and magnetized parallel to said central axis; and a pair of annular pole pieces fixed to one end of said magnet and spaced from one another along said central axis, said unit being mounted within said magnet for movement relative to said magnet along said central axis, one of said pole pieces providing a portion of a second magnetic flux path, said first and second flux paths having a substantially constant combined reluctance, the reluctance of one path decreasing and the reluctance of the other path simultaneously increasing upon relative movement between said magnet and said unit along said central axis, one of said field pieces and one of said pole pieces approaching one another and the other of said field pieces and the other of said pole pieces simultaneously drawing away from one another upon relative movement between said unit and said magnet along said central axis.

10. In combination: a unit comprising a coil having a central axis, a first tubular field piece within said coil providing a portion of a first magnetic flux path, and a second tubular field piece about said coil providing a portion of a second magnetic flux path, said coil and said field pieces having coincident central axes; a magnet within said first tubular field piece having a central axis coincident with said central axes and magnetized parallel to said central axis; and a pair of pole pieces fixed to one end of said magnet and spaced from one another along said central axis, one of said pole pieces providing a portion of said first magnetic flux path and the other of said pole pieces providing a portion of a second magnetic flux path, said first and second flux paths having a substantially constant combined reluctance, the reluctance of one path decreasing and the reluctance of the other path simultaneously increasing upon relative movement between said magnet and said unit along said central axis, one of said field pieces and one of said pole pieces approaching one another and the other of said field pieces and the other of said pole pieces simultaneously drawing away from one another upon relative movement between said unit and said magnet along said central axis.

AUSTIN N. STANTON.

REFERENCES CITED

The following references are of record in the file of this patent:

UNITED STATES PATENTS

| Number | Name | Date |
|---|---|---|
| 1,024,418 | Podlesak | Apr. 23, 1912 |
| 1,180,489 | Geist | Apr. 25, 1916 |
| 1,290,190 | Herrick | Jan. 7, 1919 |
| 1,544,010 | Jordan | June 30, 1925 |
| 2,111,643 | Salvatori | Mar. 22, 1938 |
| 2,303,413 | Washburn | Dec. 1, 1942 |
| 2,316,616 | Powell | Apr. 13, 1943 |